United States Patent [19]

Steele

[11] 3,907,374
[45] Sept. 23, 1975

[54] SWITCHES FOR CONVEYOR TUBES
[75] Inventor: James K. Steele, St. Paul, Minn.
[73] Assignee: Dynamic Air Inc., St. Paul, Minn.
[22] Filed: Feb. 11, 1974
[21] Appl. No.: 441,234

[52] U.S. Cl. ............ 302/28; 137/610; 137/625.48; 243/31; 277/70; 285/31; 285/96; 302/64
[51] Int. Cl.² ........................................ B65G 53/56
[58] Field of Search ................ 243/31; 277/70, 73; 285/18, 31, 96, 375; 302/28, 64; 137/610, 625.48

[56] References Cited
UNITED STATES PATENTS
| | | | |
|---|---|---|---|
| 406,446 | 7/1889 | Kennedy | 243/31 |
| 2,593,491 | 4/1952 | Saunders et al. | 285/31 X |
| 2,732,263 | 1/1956 | Riordan | 302/28 |
| 3,174,806 | 3/1965 | Barber et al. | 302/28 |
| 3,682,575 | 8/1972 | Guddal et al. | 137/625.48 X |

FOREIGN PATENTS OR APPLICATIONS
| | | | |
|---|---|---|---|
| 610,915 | 9/1926 | France | 302/28 |

Primary Examiner—Evon C. Blunk
Assistant Examiner—Jeffrey V. Nase
Attorney, Agent, or Firm—Jacobson and Johnson

[57] ABSTRACT

A pneumatic conveyor tube switch operable for diverting abrasive, bulky materials from a pneumatic conveying line to a position remote from the conveying line.

2 Claims, 2 Drawing Figures

SWITCHES FOR CONVEYOR TUBES

BACKGROUND OF THE INVENTION

One of the uses of pneumatic conveyor lines is to transport abrasive, heavy, lumpy materials from one location to another with selective intermediate depositing of the material in bins. In order to deposit the material at intermediate intervals, it is necessary to switch or divert the material from the pneumatic conveyor line into a bin by the use of a pneumatic conveying line switch which is permanently mounted in the pneumatic conveying line. After the required material is diverted, the material is allowed to pass through the pneumatic switch without being diverted.

One of the problems inherent with prior art pneumatic switching devices has been that it is difficult to accurately align the conveying tubes in the pneumatic switch because of the dusty environment the switch is located in. If accurate alignment of parts is not maintained, the unit will quickly become damaged by the fast moving abrasive material. Another problem has been that the prior art pneumatic switching devices have encountered problems with material build up and clogging when used to divert material out of a conveyor tube. Still other problems are that the diverting deflecting units usually must withstand tremendous amounts of force because of the high momentum generated by the fast moving materials in the conveyor tubes. This force makes it extremely difficult to seal the pneumatic conveying tubes to the pneumatic switches. A still further problem with the prior art switching devices is that the dusty environment of the switches require constant attention and replacement of parts.

Accordingly, the present invention has overcome these prior art problems by providing a rugged switch which can be accurately positioned and effectively sealed to a pneumatic conveying tube.

SUMMARY OF THE INVENTION

Briefly, the invention comprises a two position switch for a pneumatic conveying tube. The switch mechanism includes a vertical slidable member having sealing means for providing an air tight seal between the switch and the pneumatic conveying tube when the switch is in either the open position or the deflect position. The switch includes additional members for utilization of the switch mechanism in hostile dusty environments.

DESCRIPTION OF THE PREFERRED EMBODIMENT

Figure 1:
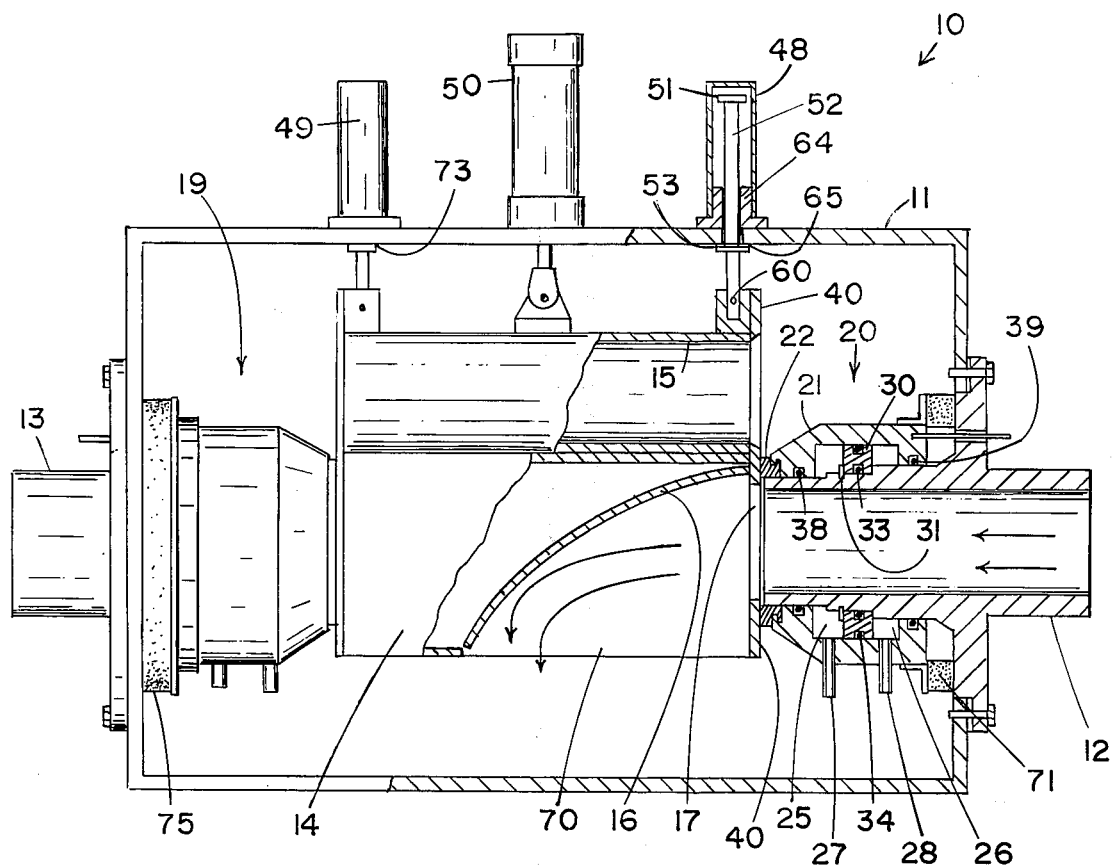
FIG. 1 shows a partial sectional elevational view of a two way switching mechanism.
Figure 2:
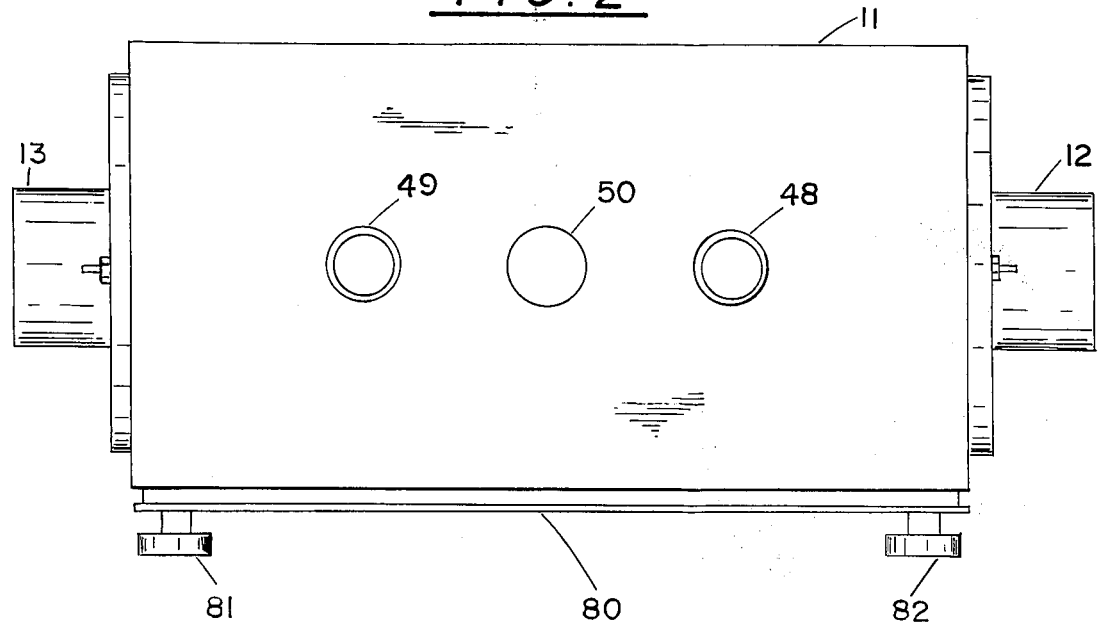
FIG. 2 shows a top view of the two way switch of FIG. 1.

Referring to FIG. 1 and FIG. 2, reference numeral 10 generally designates the two position switch of the present invention. Switch 10 comprises a housing 11 and a pneumatic conveying tube 12 located on one end and, similarly, a second identical pneumatic conveying tube 13 is located on the opposite end of housing 11. Both of the conveying tubes are detachably mounted to housing 11 by bolts or the like. As both conveying tube 12 and conveying tube 13 are identical, only one of the tubes and the sealing mechanism therearound will be described.

Located between conveying tube 12 and conveying tube 13 is a two positional, vertically slidable member 14 having a through passageway 15 in the upper portion and a deflector 16 in the lower portion. As shown in FIG. 1, deflector 16 is located immediately adjacent conveying tube 12. An opening 17 in member 14 allows for material to pass through conveying tube 12, opening 17 and be deflected downward into a bin by deflector 16. In the position shown in FIG. 1, the outer surface 40 of member 14 is seated and sealed against the pneumatic conveying tube 12 by a pressure actuated sealing mechanism 20. On the opposite end of member 14 an identical pressure actuated sealing mechanism 19 seals conveying tube 13 to member 14. As pressure actuated sealing mechanism 20 and 19 are identical, only pressure actuated sealing mechanism 20 will be described herein. Pressure actuated sealing mechanism 20 comprises an annular slidable member 21 having an annular seal 22 attached thereto which extends completely around pneumatic conveying tube 12. Annular seal 22 is typically made from rubber or the like and is held in pressure contact against sealing surface 40 of member 14 by air pressure. Sealing mechanism 20 and annular seal 22 are slidably located along the outside of conveying tube 12. Inside sealing mechanism 20 is an annular member 30 that coacts with housing 21 and conveying tube 12 to form a first pressurable plenum chamber 25 and a second pressurable plenum chamber 26 which can be supplied with pressurized air through air inlet 27 and air inlet 28 respectively. Annular member 30 is locked in position on the outside of conveying tube 12 by a retaining ring 31. An "O" ring seal 33 and a "O" ring seal 34 are located on opposite sides of sealing member 30 to form an air tight seal between plenum chambers 25 and 26. Similarly, an "O" ring seal 38 is located on one end of slidable mechanism housing 21 to provide an air tight seal between slidable members 21 and the outside surface of conveying tube 12. Similarly, located on the opposite end of slidable mechanism housing 21 is an "O" ring seal which provides an air tight seal between sliding mechanism housing 21 and the outside of conveying tube 12.

The air inlet 27 to annular plenum chamber 25 allows one to introduce pressurized air into plenum chamber 25. If air pressure in chamber 25 is greater than the air pressure in chamber 26, it produces a force which forces sliding mechanism housing 21 to the left. As housing 21 is forced to the left, sealing member 22 seals or abuts against the surface 40 of member 14 in direct proportion to the force generated by the differential air pressure in plenum chambers 25 and 26. Thus, the conveying tube is effectively sealed against surface 40 by the differential air pressure between chamber 25 and chamber 26. I have found that pressure force from air chambers allows me to maintain the same sealing force between member 14 and conveying tube 12 even though during operation of the deflecting unit 16 there may be lateral deflection or displacement of member 14 because of the large amount of thrust on deflector 10. That is, by maintaining a constant pressure differential between chamber 25 and chamber 26, it insures that the sealing force between member 11 and conveying tube 12 is held constant and consequentially the problem of leakage due to displacement of member 14 is eliminated.

When one wishes to allow the material to pass through switch 10 by allowing the material to flow through passageway 15, one must be able to quickly release and seal around the pneumatic conveying tubes. If the seals are sealed tightly to member 14 it obviously will be difficult to slide member 14 downward. In order to divert the material from the deflect position to the passageway, the pressure in plenum chamber 25 is decreased and the pressure in plenum chamber 26 is increased. By creating a higher pressure in chamber 26 than in chamber 25, one drives sliding mechanism housing 21 away from sealing surface 40 thus breaking the seal between sealing surface 40 and annular member.

While switching mechanism 19 has not been shown and described, it should be understood that in this embodiment switching mechanism 19 and conveying tube 13 operates in tandem with conveying tube 12 and sliding mechanism 20 so that the application of pressure simultaneously seals or releases the sliding mechanisms which are located on both ends of member 14. After releasing the seals, a signal is applied to hydraulic member 50 which lowers member 14 and conveying tube 15 into alignment with conveying tube 12. In order to obtain accurate alignment of the openings in member 14 and the conveying tubes, a pair of guide mechanisms 48 and 49 are mounted on housing 11. Guide mechanism 48 contains a guide rod 52 which includes an upper stop 51 for the proper vertical positioning of conveying tube 15 with respect to conveying tube 12. Similarly, a lower stop 53 on guide rod 52 provides for the proper vertical positioning of deflector 16 when the deflector is to be positioned with respect to conveying tube 12. It should be noted that guide rod 52 is attached with a pin joint 60 to member 14. The purpose of the pin joint 60 is to allow a certain amount of lateral movement of the member 14 during the up or down motion of member 14 as well as during the operation of the pneumatic conveying line.

Guide rod 52 slides in a bushing bearing 64 which is mounted to housing 11. Located immediately on the inside of housing 11 is a felt sealing ring 65 which prevents any dust or material from entering into the guide rod slot. The opposite side contains an identical guide member 49 which will not be described as its function and components are identical to guide member 48.

When deflector 16 is positioned to deflect material passing through conveying tube 12, dust is generated in the interior of housing 11 because the opening 70 directs the material to an open bin. This dust causes problems in the operation of pneumatic switch and to overcome the problem of dust ruining the moving parts of my sliding mechanism, an annular seal 71 is located on conveying tube 12 and sliding mechanism housing 21 to prevent entry of dust into the moving parts of sliding mechanism 20 and similarly an annular seal 75 is located on conveying tube 13 to prevent entry of dust into the moving parts of slidable mechanism 19. There are provided dust seals 65 and 73 to prevent dust from entering the guide rod assemblies 48 and 49.

One of the additional features of my invention is that when member 14 is displaced from a lower position to an upper position, annular member 22 produces a self cleaning action of sealing surface 40 if annular member 22 is allowed to lightly touch sealing surface 40. This feature is beneficial in insuring a good seal is produced each time the switch seal is broken. That is, seal 22 will wipe the surface as it slides past the sealing surface.

In order to provide easy accessibility to sliding mechanism 19, sliding mechanism 20 and member 14, I have provided housing 11 with a removable side 80 which can be quickly removed by loosening and removing quick release members 81 and 82. This allows an operator quick accessibility to the switch should a breakdown occur.

Another feature of the present invention is that various sections can be removed and replaced. For example, conveying tube 12 can be removed and replaced if it should become worn from use.

While the preferred embodiment shows a two position switch for allowing material to pass through the switch or be diverted by a deflector, it is apparent that the member 14 could contain two conveying tubes that could direct the material to different positions.

One of the other features of the present invention shown in FIG. 1 is that the close or tight sealing of the conveying tube 12 and member 14 virtually eliminates any gap between conveying tube 12 and member 14. It has been found that a gap between parts not only causes accumulation of materials but also tends to erode away the corner of the tube.

While the unit is shown without automatic circuitry, it is apparent that if desired the unit can be operated remotely and a suitable limit switch can be installed so the switching operation is automatically sequenced.

I claim:

1. A switching mechanism for a pneumatic conveying system having at least two positions;

a housing;

a first pneumatic conveying tube mounted to said housing, said first pneumatic conveying tube operable for pneumatically transporting material therein;

a second pneumatic conveying tube operable for pneumatically transporting material therein;

a member movably mounted to said housing and operable by a power cylinder, said member having at least two conveying attachment sections therein, one of said conveying attachment sections comprises a deflector, each of said conveying attachment sections having a sealing surface thereon;

a first pressure controllable slidable sealing mechanism mounted on said first pneumatic conveying tube, said slidable sealing mechanism is pneumatically operated, said slidable sealing mechanism comprising an annular housing which coacts with said first pneumatic conveying tube to define a pair of annular plenum chambers, said slidable sealing mechanism having a first sealing position and a second release position, a sealing member located around said pneumatic conveying tube, said sealing member operable for being held in pressure contact between a sealing surface on said sealing member and said first slidable sealing mechanism by said first slidable sealing mechanism to thereby form an air tight seal between said sealing surface on said sealing member and said first pneumatic conveying tube; means for guiding and aligning said conveying attachment sections to said first pneumatic conveying tube and including a pair of guide rods having stops thereon, said means for guiding and aligning being pivotally mounted to said member;

a second pressure controllable slidable sealing mechanism oppositely disposed from said first pressure controllable slidable sealing mechanism.

2. The invention of claim 1 including dust seals mounted on said slidable sealing mechanisms to prevent dust from entering the sliding surface between said slidable sealing mechanism and said conveying tube.

* * * * *